July 22, 1947.          H. E. DUFFY                2,424,440
       AIR PRESSURE SYSTEM FOR MULTIPLE TANK FUEL FEED DEVICES
                      Filed Aug. 14, 1945
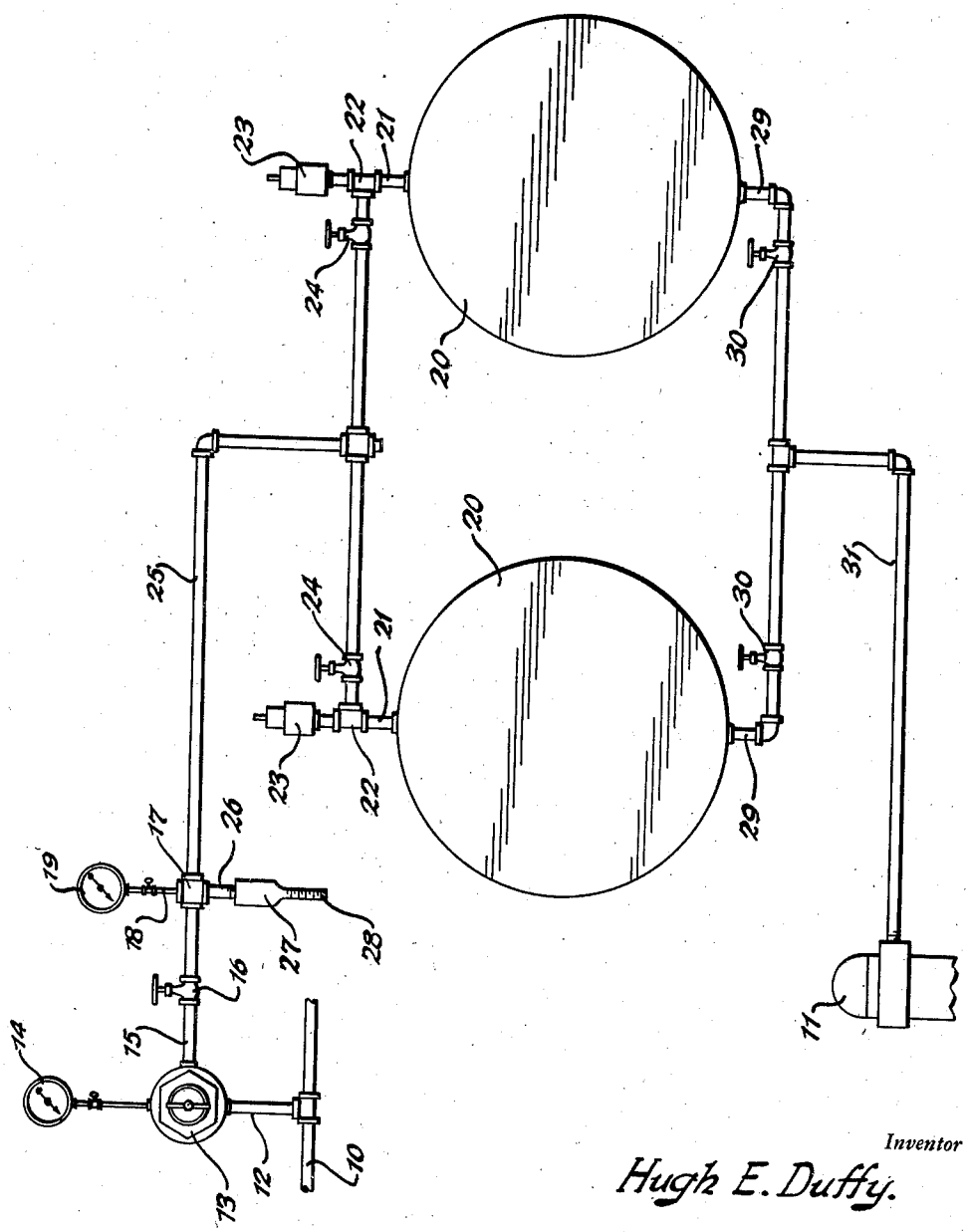
Inventor
Hugh E. Duffy.
By Clarence A. O'Brien
and Harvey B. Jacobson
Attorneys Patented July 22, 1947

2,424,440

UNITED STATES PATENT OFFICE 2,424,440

AIR PRESSURE SYSTEM FOR MULTIPLE TANK FUEL FEED DEVICES

Hugh E. Duffy, Chillicothe, Ohio

Application August 14, 1945, Serial No. 610,830

1 Claim. (Cl. 158—36.5)

This invention relates to a fuel system and more particularly to the fuel system of large carriers, such as trucks, buses and the like.

The primary object of the invention is to avoid the partial or complete interruption of the flow of fuel from the fuel supply tank to the carburetor and to insure the smooth even flow of the fuel under a constant and uniform pressure.

Another object of the invention is to prevent the formation of bubbles of vapor or gas in the fuel-feeding system, or what is commonly referred to as "vapor lock."

The above and other objects may be attained by employing this invention, which embodies among its features a fuel supply tank which is closed to atmosphere, a fuel supply pipe leading from the tank to the carburetor of the vehicle, a branch pipe leading from the air brake supply line of the vehicle, a reducing valve connected to the branch pipe, a feed line leading from the reduced pressure side of the pressure reducing valve to the top of the fuel tank, whereby a constant and uniform air pressure may be maintained on the top surface of the fuel within the tank.

Other features include a pressure relief valve interposed in the fuel supply line between the pressure reduction valve and the fuel tank, and auxiliary means in the pressure supply line for supplying pressure to the fuel tank in case the main supply fails.

In the drawings:

The single figure discloses in diagrammatic form the features of this invention.

Referring to the drawings in detail, the main pressure air line of the air brake system of a vehicle is designated 10 and the carburetor of the power unit of the vehicle is designated 11. Leading from the main air pressure line 10 is a branch pipe 12 to the end of which is attached a pressure-reducing valve 13 which has connected thereto a pressure gauge 14 which is preferably located on the instrument board of the vehicle and is connected in such a manner as to show the air pressure in the main line 10. Leading from the low pressure connection of the pressure-reducing valve 13 is a branch pipe 15 which is connected through a quick-opening valve 16 to a cross 17 from one branch of which leads a pipe 18 which is connected to a low pressure gauge 19 preferably mounted on the instrument board of the vehicle.

In the particular form of the invention herein shown there is provided a pair of fuel tanks 20, each of which is provided with an air tight filling opening (not shown) which is so arranged that while it may be open for filling purposes, when it is closed, it is sealed against atmosphere. Connected to the upper side of each tank 20 is a nipple 21, the upper end of which is connected to a T 22 to one leg of which is connected a pressure relief or safety valve 23. The third leg of each T 22 is connected through a valve 24 to a low pressure supply pipe 25 which in turn is connected to one of the branches of the cross 17. Leading from the fourth branch of the cross 17 is a nipple 26 carrying at its end a check valve 27 which is provided with an externally screwthreaded stem 28 to which the end of an ordinary hand pump may be attached.

Leading from the bottom of each tank 20 is a nipple 29 which is connected through valves 30 to a fuel supply line 31 which leads to the carburetor 11. It will thus be seen that by closing the valve 24 and the valve 30 of its respective tank, such tank may be isolated from the system so that it may be filled without interrupting the operation of the engine.

In operation, it will be understood that the high pressure line 10 of the braking system of the vehicle usually operates at pressures ranging from 80 to 100 pounds per square inch so that air flowing through the pipe 12 will be at the same pressure. Upon encountering the pressure-reducing valve 13, which also is preferably mounted on the instrument board of the vehicle, the air passing from the low pressure side of the valve through the nipple 15 will be reduced in pressure to somewhere in the vicinity of 5 pounds per square inch. Under normal operating conditions, this pressure will be readable on the gauge 19 and the air will flow through the valve 16, cross 17, pipe 25, to the fuel supply tank 20, thus forming an air cushion on the upper surface of the fuel in the tank which remains uniformly constant at about 5 pounds pressure per square inch. It will thus be seen that the fuel is ejected from the fuel tank through the fuel supply pipe 31 to the carburetor under constant and uniform pressure, and without agitation so that there is no danger of interruption of the fuel flow through the formation of bubbles of vapor or gas in the fuel feeding system. Consequently, stalling of the engine through what is termed vapor lock is prevented and smooth continuous operation of the engine may be assured. Due to the fact that the air pressure to the fuel supply tank remains at all times constant through the operation of the pressure-reducing valve 13, it is evident that pressure fluctuations on the surface of the fuel are avoided, and since agitation of the fuel as by pumping is also eliminated, the danger of vapor lock is wholly removed.

While in the foregoing there has been shown and described the preferred embodiment of this invention, it is to be understood that minor changes in the details of construction, combination and arrangement of parts may be resorted to without departing from the spirit and scope of the invention as claimed.

I claim:

In a fuel system for a motor driven vehicle having a carburetor; a pair of fuel tanks each closed to atmosphere, a fuel discharge pipe leading from the bottom of each fuel tank to a common line leading to the carburetor of the vehicle, a valve in each pipe to arrest the flow of fuel from a tank into the fuel line, a branch pipe leading from the top of each tank to a common air supply pipe, a pressure relief valve in each branch pipe, a cut-off valve in each branch pipe, a coupling in said air supply pipe, a pressure gage connected to the coupling, a check valve connected to the coupling to which a hand pump may be connected to supply air to the air supply pipe, a pressure reducing valve at the end of the air supply pipe opposite that connected to the branch pipes, a high pressure air supply pipe connected to the pressure reducing valve and to a source of high pressure air and a pressure gage connected to the high pressure air supply pipe.

HUGH E. DUFFY.

REFERENCES CITED

The following references are of record in the file of this patent:

UNITED STATES PATENTS

| Number | Name | Date |
|---|---|---|
| 702,529 | Best | June 17, 1902 |
| 1,175,900 | Jordan | Mar. 14, 1916 |
| 1,407,374 | Buckendale | Feb. 21, 1922 |
| 1,419,553 | Galloway | June 13, 1922 |
| 1,398,315 | Cawthra | Nov. 29, 1921 |
| 1,095,763 | Winton | May 5, 1914 |
| 1,392,532 | Snell | Oct. 4, 1921 |

FOREIGN PATENTS

| Number | Country | Date |
|---|---|---|
| 3,774 | Great Britain | 1913 |

OTHER REFERENCES

Bendix-Westinghouse Air Brake Maintenance Manual—B-W A. B. Co., 1941.